(12) United States Patent
Reszewicz et al.

(10) Patent No.: US 11,867,305 B2
(45) Date of Patent: Jan. 9, 2024

(54) RETAINER GUIDANCE FOR RINSING VALVES

(71) Applicant: B/E Aerospace, Inc., Winston Salem, NC (US)

(72) Inventors: Modest Adam Reszewicz, Wroclaw (PL); Pawel Swirniak, Wroclaw (PL); Yen Chuh, Winston-Salem, NC (US); Thao Hoang, Arlington, WA (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 18/096,681

(22) Filed: Jan. 13, 2023

(65) Prior Publication Data

US 2023/0167916 A1    Jun. 1, 2023

Related U.S. Application Data

(63) Continuation of application No. 17/111,767, filed on Dec. 4, 2020, now Pat. No. 11,555,552.

(60) Provisional application No. 63/090,524, filed on Oct. 12, 2020.

(51) Int. Cl.
    *F16K 27/02*   (2006.01)
    *E03C 1/23*    (2006.01)
    *F16K 1/50*    (2006.01)

(52) U.S. Cl.
    CPC ............ *F16K 27/02* (2013.01); *E03C 1/2302* (2013.01); *F16K 1/50* (2013.01)

(58) Field of Classification Search
    CPC ........ F16K 15/06; F16K 15/067; F16K 27/02; E03C 1/23; E03C 1/2302
    See application file for complete search history.

(56) References Cited

U.S. PATENT DOCUMENTS

| 1,826,639 | A  | 10/1931 | Rolf |
| 2,282,212 | A  | 5/1942  | Pope |
| 2,743,078 | A  | 4/1956  | Walter |
| 2,989,758 | A  | 6/1961  | Turek |
| 6,023,795 | A  | 2/2000  | Potter et al. |
| 8,578,959 | B2 | 11/2013 | Hoang et al. |
| 10,189,194 | B2 | 1/2019 | Funari et al. |
| 2010/0275357 | A1 | 11/2010 | Fuoco et al. |
| 2014/0130873 | A1 | 5/2014  | Brody |

FOREIGN PATENT DOCUMENTS

| AU | 606060 B2       | 1/1991 |
| CN | 209340557 U     | 9/2019 |
| EP | 0573865 A1      | 12/1993 |
| GB | 1527775 A       | 10/1978 |
| JP | 2001020350 A    | 1/2001 |
| KR | 20130137748 A   | 12/2013 |

OTHER PUBLICATIONS

Extended European Search Report dated Mar. 7, 2022, issued during the prosecution of European Patent Application No. EP 21202234.7.

*Primary Examiner* — Reinaldo Sanchez-Medina
(74) *Attorney, Agent, or Firm* — Locke Lord LLP; Joshua L. Jones; Scott D. Wofsy

(57) ABSTRACT

A valve assembly includes a valve head. A valve stem extends from the valve head and into a drain bore in a housing. A first guidance retainer ring is mounted around the valve stem at a first axial location on the valve stem. A second guidance retainer ring is mounted around the valve stem at a second axial location on the valve stem spaced apart from the first axial location.

10 Claims, 2 Drawing Sheets

RETAINER GUIDANCE FOR RINSING VALVES

CROSS REFERENCE TO RELATED APPLICATION

This is a continuation of U.S. patent application Ser. No. 17/111,767 filed Dec. 4, 2020, which application claims the benefit of priority to U.S. Provisional Patent Application Ser. No. 63/090,524, filed on Oct. 12, 2020. The disclosures of both of these previous applications are incorporated herein by reference in their entirety.

BACKGROUND

1. Field

The present disclosure relates to drains and drain valves, and more particularly to valve retainer guidance.

2. Description of Related Art

Main seal assembly guidance in rinsing valves traditionally has some short comings that can later cause problems in the field. Stress caused by a retainer acting on the housing surface causes dents in the housing surface and after time, it is possible for the valve to become stuck in one position.

The conventional techniques have been considered satisfactory for their intended purpose. However, there is an ever present need for improved systems and methods for retainer guidance in drain valves. This disclosure provides a solution for this need.

SUMMARY

A valve assembly includes a valve head. A valve stem extends from the valve head and into a drain bore in a housing. A first guidance retainer ring is mounted around the valve stem at a first axial location on the valve stem. A second guidance retainer ring is mounted around the valve stem at a second axial location on the valve stem spaced apart from the first axial location.

The first guidance retainer ring can include an inner ring that forms a full 360° ring and an outer ring spaced radially apart from the inner ring. The outer ring can form an incomplete ring less than a full 360°. The outer ring can contact the housing. At least one flow bore can be defined through the first guidance retainer ring between the inner ring and the outer ring of the first guidance retainer ring. The at least one flow bore can include two arcuate bores, with three spokes connecting the inner and outer rings of the first guidance retainer ring. The first and second guidance retainer rings can be identical in structure to one another.

The incomplete ring of the first guidance retainer ring can be circumferentially offset relative to the incomplete ring of the second guidance retainer ring. The incomplete ring of the first guidance retainer ring can be circumferentially offset by 180° relative to the incomplete ring of the second guidance retainer ring.

In a first position the valve head can be spaced apart from an opening of the valve bore, and in a second position the valve head can be sealed against the opening of the valve bore. The first and second guidance retainer rings can follow the valve head and valve stem moving between the first and second positions when moving relative to the housing. The valve stem and the first and second guidance retainer ring can maintain a net of zero force in a radial direction relative to a longitudinal axis of the valve stem.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
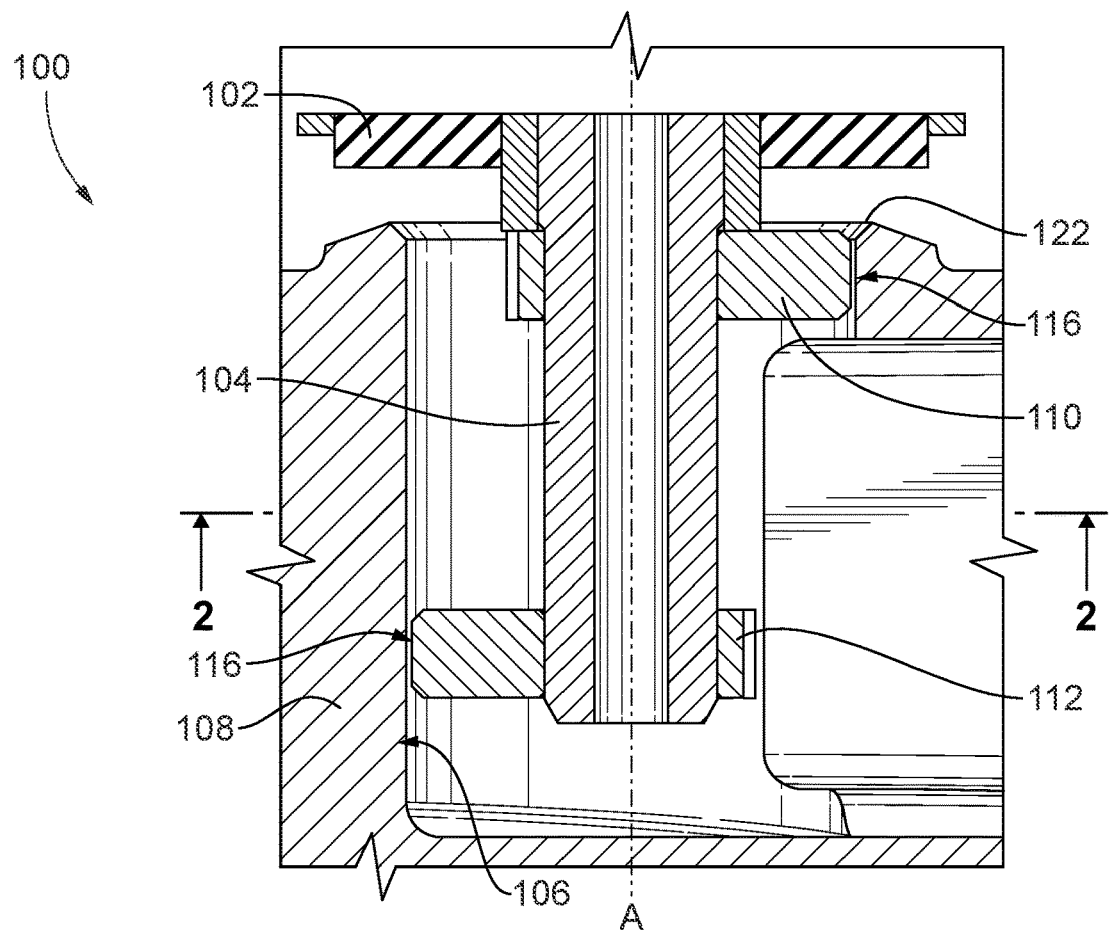
FIG. 1 is a cross-sectional side elevation view of an embodiment of a valve assembly constructed in accordance with the present disclosure, showing the guidance retainer rings.

Reference will now be made to the drawings wherein like reference numerals identify similar structural features or aspects of the subject disclosure. For purposes of explanation and illustration, and not limitation, a partial view of an embodiment of a valve assembly in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide valve retainer guidance for movement of a valve stem within a housing.

The valve assembly 100 includes a valve head 102. A valve stem 104 extends from the valve head 102 and into a drain bore 106 in a housing 108. A first guidance retainer ring 110 is mounted around the valve stem 104 at a first axial location on the valve stem 104. A second guidance retainer ring 112 is mounted around the valve stem 104 at a second axial location (along longitudinal axis A) on the valve stem 104, spaced apart from the first axial location.

Figure 2:
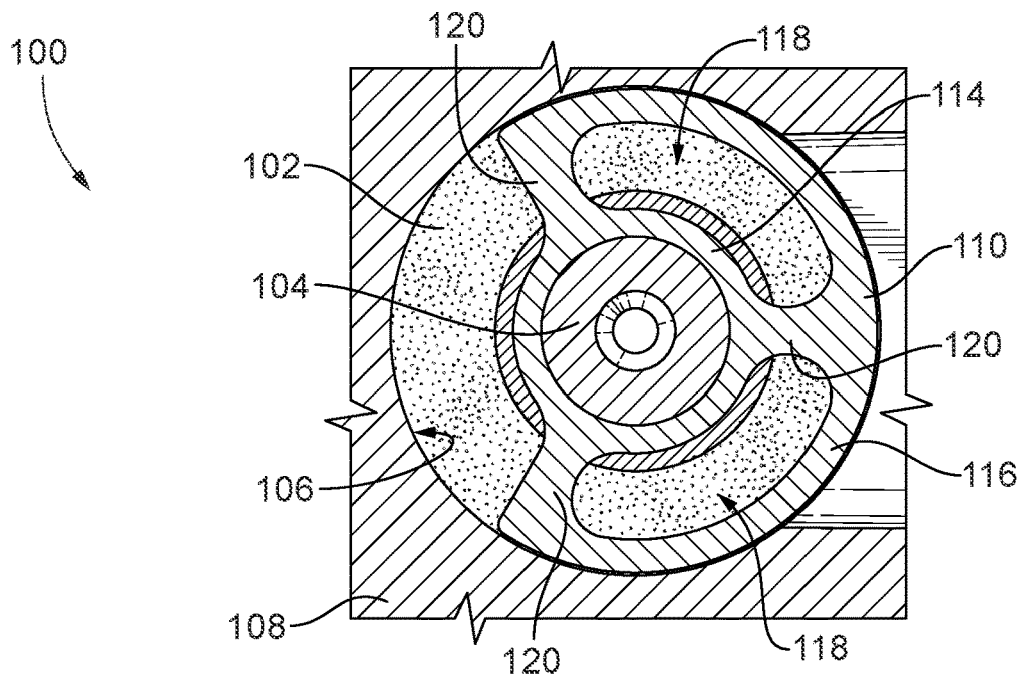
FIG. 2 is a plan view of the valve assembly of FIG. 1, showing the flow bores through one of the guidance retainer rings.
Figure 3:
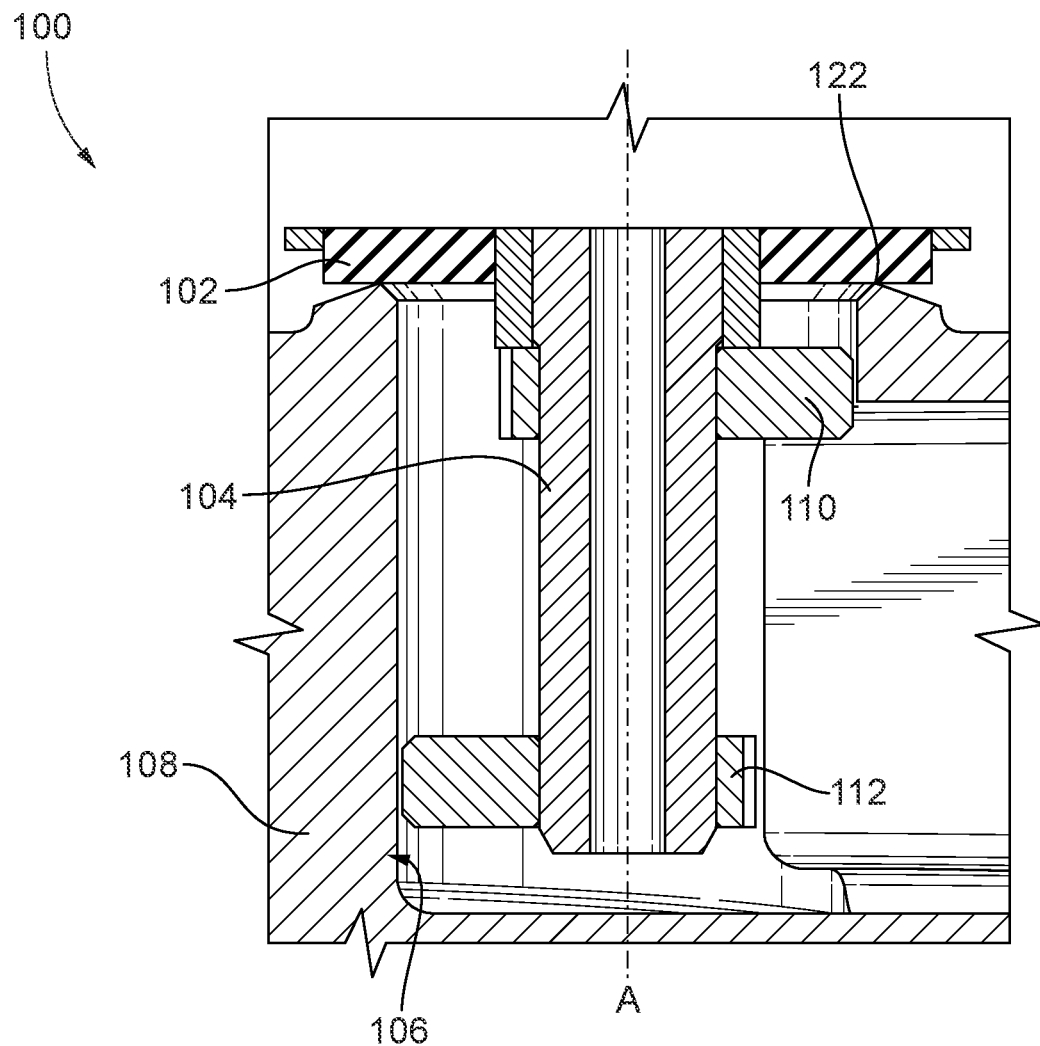
FIG. 3 is a cross-sectional side elevation view of the valve assembly of FIG. 1, showing the valve head, the valve stem, and the guidance retainer rings in a second position.

With reference now to FIG. 2, the first guidance retainer ring 110 includes an inner ring 114 that forms a full 360° ring around the valve stem 104. The first guidance retainer ring 110 also includes an outer ring 116 spaced radially apart from the inner ring 114 relative to the longitudinal axis A shown in FIG. 1. The outer ring 116 forms an incomplete ring, less than a full 360°, e.g. extending only about 240° around the circumference around the longitudinal axis A of FIG. 1. The outer ring 116 contacts the housing 108. A pair of arcuate flow bores 118 are defined through the first guidance retainer ring 110 between the inner ring 114 and the outer ring 116. Three spokes 120 connect the inner and outer rings 114, 116. Those skilled in the art will readily appreciate that any suitable number or shape of flow bores and spokes can be used without departing from the scope of this disclosure. The flow bores 118 allow for fluids to pass through the drain bore 106, flowing through the first guidance retainer ring 110.

Referring again to FIG. 1, the second guidance retainer ring 112 can be structurally identical to the first guidance retainer ring 110, and the outer ring 116 of each contacts the housing 108. The incomplete outer ring 116 of the first guidance retainer ring 110 is circumferentially offset by 180° relative to the incomplete outer ring 116 of the second guidance retainer ring 112. This is shown in FIG. 1, where the outer ring 116 of the first guidance retainer ring 110 extends more fully to the right as oriented in FIG. 1, and the outer ring 116 of the second guidance retainer ring 112 extends more fully to the left as oriented in FIG. 1. In a first position, shown in FIG. 1, the valve head 102 is spaced apart from an opening 122 of the valve bore 106. This position allows flow through the drain bore 106. In a second position, shown in FIG. 3, the valve head 102 is sealed against the opening 122 of the valve bore 106, preventing flow through the valve bore 106. The first and second guidance retainer rings 110, 112 follow the valve head 102 and valve stem 104 when moving between the first and second positions, i.e. when moving relative to the housing 108 to open and close the valve assembly 100. The valve stem 104 and the first and second guidance retainer rings 110, 112 maintain a net of zero force in a radial direction relative to a longitudinal axis A of the valve stem 104, i.e. in a direction to the right and left in FIGS. 1 and 3. This reduces wear between the housing 108 and the first and second guidance retainer rings 110, 112. This can provide similar pressure drop relative to traditional guidance techniques, but can decrease forces acting on a retainer relative to traditional techniques. The reduction in forces can improve valve reliability and lifetime.

The methods and systems of the present disclosure, as described above and shown in the drawings, provide for valve retainer guidance for movement of a valve stem within a housing with improved performance relative to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A valve assembly comprising:
 a valve head;
 a valve stem extending from the valve head and into a drain bore in a housing;
 a first guidance retainer ring mounted around the valve stem at a first axial location on the valve stem; and
 a second guidance retainer ring mounted around the valve stem at a second axial location on the valve stem spaced apart from the first axial location, wherein the first guidance retainer ring includes an inner ring that forms a full 360° ring and an outer ring spaced radially apart from the inner ring by a first plurality of spokes, wherein the outer ring forms an incomplete ring less than a full 360° and forms a circumferentially extending bridge across the spokes of the first plurality of spokes, wherein the outer ring of the first guidance retainer ring contacts the housing, wherein the second guidance retainer ring includes an inner ring that forms a full 360° ring and an outer ring spaced radially apart from the inner ring by a second plurality of spokes, wherein the outer ring forms an incomplete ring less than a full 360° and forms a circumferentially extending bridge across the spokes of the second plurality of spokes, wherein the outer ring of the second guidance retainer ring contacts the housing, wherein the incomplete ring of the first guidance retainer ring is circumferentially offset relative to the incomplete ring of the second guidance retainer ring.

2. The valve assembly as recited in claim 1, wherein in a first position the valve head is spaced apart from an opening of the valve bore, and in a second position the valve head is sealed against the opening of the valve bore.

3. The valve assembly as recited in claim 2, wherein the first and second guidance retainer rings follow the valve head and valve stem moving between the first and second positions when moving relative to the housing.

4. The valve assembly as recited in claim 3, wherein the valve stem and the first and second guidance retainer ring maintain a net of zero force in a radial direction relative to a longitudinal axis of the valve stem.

5. The valve assembly as recited in claim 1, wherein at least one flow bore is defined through the first guidance retainer ring between the inner ring and the outer ring of the first guidance retainer ring.

6. A valve assembly comprising:
 a valve head;
 a valve stem extending from the valve head and into a drain bore in a housing;
 a first guidance retainer ring mounted around the valve stem at a first axial location on the valve stem; and
 a second guidance retainer ring mounted around the valve stem at a second axial location on the valve stem spaced apart from the first axial location, wherein the first guidance retainer ring includes an inner ring that forms a full 360° ring and an outer ring spaced radially apart from the inner ring, wherein the outer ring forms an incomplete ring less than a full 360°, wherein the outer ring of the first guidance retainer ring contacts the housing, wherein the second guidance retainer ring includes an inner ring that forms a full 360° ring and an outer ring spaced radially apart from the inner ring, wherein the outer ring forms an incomplete ring less than a full 360°, wherein the outer ring of the second guidance retainer ring contacts the housing, wherein at least one flow bore is defined through the first guidance retainer ring between the inner ring and the outer ring of the first guidance retainer ring, wherein the at least one flow bore defines a radially outer bore boundary, wherein the outer ring of the first guidance retainer ring extends circumferentially across the radially outer bore boundary.

7. The valve assembly as recited in claim 6, wherein in a first position the valve head is spaced apart from an opening of the valve bore, and in a second position the valve head is sealed against the opening of the valve bore.

8. The valve assembly as recited in claim 7, wherein the first and second guidance retainer rings follow the valve head and valve stem moving between the first and second positions when moving relative to the housing.

9. The valve assembly as recited in claim 8, wherein the valve stem and the first and second guidance retainer ring maintain a net of zero force in a radial direction relative to a longitudinal axis of the valve stem.

10. The valve assembly as recited in claim 6, wherein at least one flow bore is defined through the first guidance retainer ring between the inner ring and the outer ring of the first guidance retainer ring.

\* \* \* \* \*